(12) United States Patent
Mathews et al.

(10) Patent No.: US 7,500,198 B2
(45) Date of Patent: Mar. 3, 2009

(54) METHOD AND APPARATUS FOR MODIFYING SKIN AND THEME SCREENS ON A COMMUNICATION PRODUCT

(75) Inventors: Ajit Mathews, Plantation, FL (US); Brian M. Elwell, Coral Springs, FL (US); Douglas E. Ross, Davie, FL (US); Ketan M. Shah, Miami, FL (US)

(73) Assignee: Motorola, Inc., Schaumburg, IL (US)

(*) Notice: Subject to any disclaimer, the term of this patent is extended or adjusted under 35 U.S.C. 154(b) by 916 days.

(21) Appl. No.: 10/424,121

(22) Filed: Apr. 25, 2003

(65) Prior Publication Data

US 2004/0216054 A1    Oct. 28, 2004

(51) Int. Cl.
*G06F 3/00* (2006.01)
*G06F 3/048* (2006.01)
*G06F 17/00* (2006.01)
*H04M 11/04* (2006.01)
*H04Q 7/20* (2006.01)

(52) U.S. Cl. .................... 715/744; 715/762; 715/766; 715/204; 715/243; 455/404.2; 455/456.1

(58) Field of Classification Search ............ 715/744, 715/760, 762, 864, 866, 765, 517, 204, 243, 715/766; 455/414.2, 404.2, 456.1
See application file for complete search history.

(56) References Cited

U.S. PATENT DOCUMENTS

| | | | |
|---|---|---|---|
| 5,905,492 A | 5/1999 | Straub et al. | |
| 6,091,411 A | 7/2000 | Straub et al. | |
| 6,392,671 B1 | 5/2002 | Glaser | |
| 6,496,979 B1 | 12/2002 | Chen et al. | |
| 2001/0040590 A1* | 11/2001 | Abbott et al. | 345/700 |
| 2002/0054046 A1* | 5/2002 | Evans et al. | 345/581 |
| 2002/0149618 A1* | 10/2002 | Estrada et al. | 345/760 |
| 2003/0052921 A1 | 3/2003 | Ulrich et al. | |
| 2003/0056026 A1 | 3/2003 | Anuff et al. | |
| 2004/0054627 A1* | 3/2004 | Rutledge | 705/50 |
| 2006/0062094 A1* | 3/2006 | Nathan et al. | 369/30.06 |
| 2007/0033254 A1* | 2/2007 | AlHusseini et al. | 709/205 |

* cited by examiner

*Primary Examiner*—Ting Zhou (57) ABSTRACT

A portable communication device (10) having a customizable skin and theme on a display (30) of the communication device can include a transceiver (38 and 44), a display coupled to the transceiver, a memory (32 or 14) having stored therein at least two skin and theme types (24) and at least one encapsulated data entry associated with each of the skin and theme types, and a processor (12) coupled to the transceiver and the display. The processor can be programmed to dynamically update the display in the communication device based upon a selection of at least one among the skin and theme types and based upon at least one encapsulated data entry associated with a selected skin and theme type.

12 Claims, 6 Drawing Sheets

METHOD AND APPARATUS FOR MODIFYING SKIN AND THEME SCREENS ON A COMMUNICATION PRODUCT

CROSS-REFERENCE TO RELATED APPLICATIONS

Not applicable

FIELD OF THE INVENTION

This invention relates generally to skins and themes, and more particularly to a method and system for creating customized skins and themes on a display of a communication.

BACKGROUND OF THE INVENTION

More and more customizations are being enabled for newer generations of mobile handsets. End users can now customize ring tones, wallpapers, and other functions. Currently, end users are not able to customize device behaviors based on a one-to-one relationship between the parties communicating or upon particular events occurring in relation to the mobile handset. For example, the call interfaces and helper functionality for a call to a business associate is the same as the call interfaces and helper functionality for a call to a family member. Currently, who contacts you, how they contact you or where they contact you does not have a visible effect on the screen or interface provided to a user on a display of a communication device.

Current user interfaces and screens are either fixed or not flexible enough to be dynamically user configurable. As users demand the ability to have more and more different ergonomics (such as the took and feet and functionality of their user interfaces), the greater the need for a dynamically tailored user interface. Additionally, current mobile handsets do not have interfaces or other functionality that dynamically changes based on internal or external triggers related to the mobile handsets.

Although Microsoft supports XML based home screen layouts for smartphones and User Interface skins exists for applications such as Realplayer, such applications do not have a way to specify different themes in a theme pack. Nor do they contemplate all the environmental variables that can trigger the dynamic change of skins and themes.

SUMMARY OF THE INVENTION

A method, system and apparatus for providing customized skins and themes on a portable communication that can be dynamically configurable is provided. Embodiments in accordance with the present invention can offer users the ability to have tailored user interfaces or a tailored look and feel through various screens on a portable communication product such as a mobile phone. Moreover, a carrier can also tailor the subscriber screens having carrier's own themes in subscriber's handsets.

In a first aspect of the present invention, a portable communication device having a customizable skin and theme on a display of the communication device can include a transceiver, a display coupled to the transceiver, a memory having stored therein at least two skin and theme types and at least one encapsulated data entry associated with each of the skin and theme types, and a processor coupled to the transceiver and the display. The processor can be programmed to dynamically update the display in the communication device based upon a selection of at least one among the skin and theme types and based upon at least one encapsulated data entry associated with a selected skin and theme type.

In a second aspect of the present invention, a system of customizing a skin and theme on a display of a portable communication device, comprises a memory in the portable communication device for receiving and storing therein a theme pack having multiple theme types, a theme property table in the memory having information necessary for rendering a screen in accordance with a selected theme type, and a theme manager for extracting theme information associated with the selected theme type among the multiple theme types and updating the theme property table with the theme information.

In a third aspect of the present invention, a system of customizing a screen on a portable communication device can include a resource editor for generating a theme pack having multimedia data, a pack manager for loading the theme pack during a power up of the portable communication device, and a processor in the portable communication device. The processor can be programmed to register the theme pack with a theme manager within the portable communication device and create a theme formatter if a dialog type has a theme associated with the dialog type, wherein the theme formatter updates a display. The system can further include an image manager coupled to the theme formatter that invokes an appropriate decoder for image decoding of at least a portion of the multimedia data.

In a fourth aspect of the present invention, a method of customizing a skin and theme on a display of a portable communication device upon an event can include the steps at the portable communication device of determining if the event has occurred and if the event has an associated skin and theme, and if the associated skin and theme exists, updating the display with the associated skin and theme.

In a fifth aspect of the present invention, a method of customizing a screen on a portable communication device can include the steps of initializing a theme manager, determining if a valid theme pack exists and drawing a generic user interface for all screen types if a valid theme pack does not exist, extracting screen related information and updating a theme property table using the theme manager. Upon an event requiring the rendering of the screen, the method can determine if the theme property table has sufficient information to render the screen and subsequently rendering the screen with a selected theme using information from the theme property table if the theme property table has sufficient information to render the screen and otherwise rendering the screen with a default theme.

In yet another aspect of the present invention, a machine readable storage can include a computer program executable by a machine for causing the machine to perform the step of specifying a layout of multiple screen elements using a instance of XML scripting language and generating a plurality of themes in a single theme pack using an XML parser and a theme pack dynamic linked list by autocode generating binary files representative of the plurality of themes.

DETAILED DESCRIPTION OF THE DRAWINGS

Figure 1:
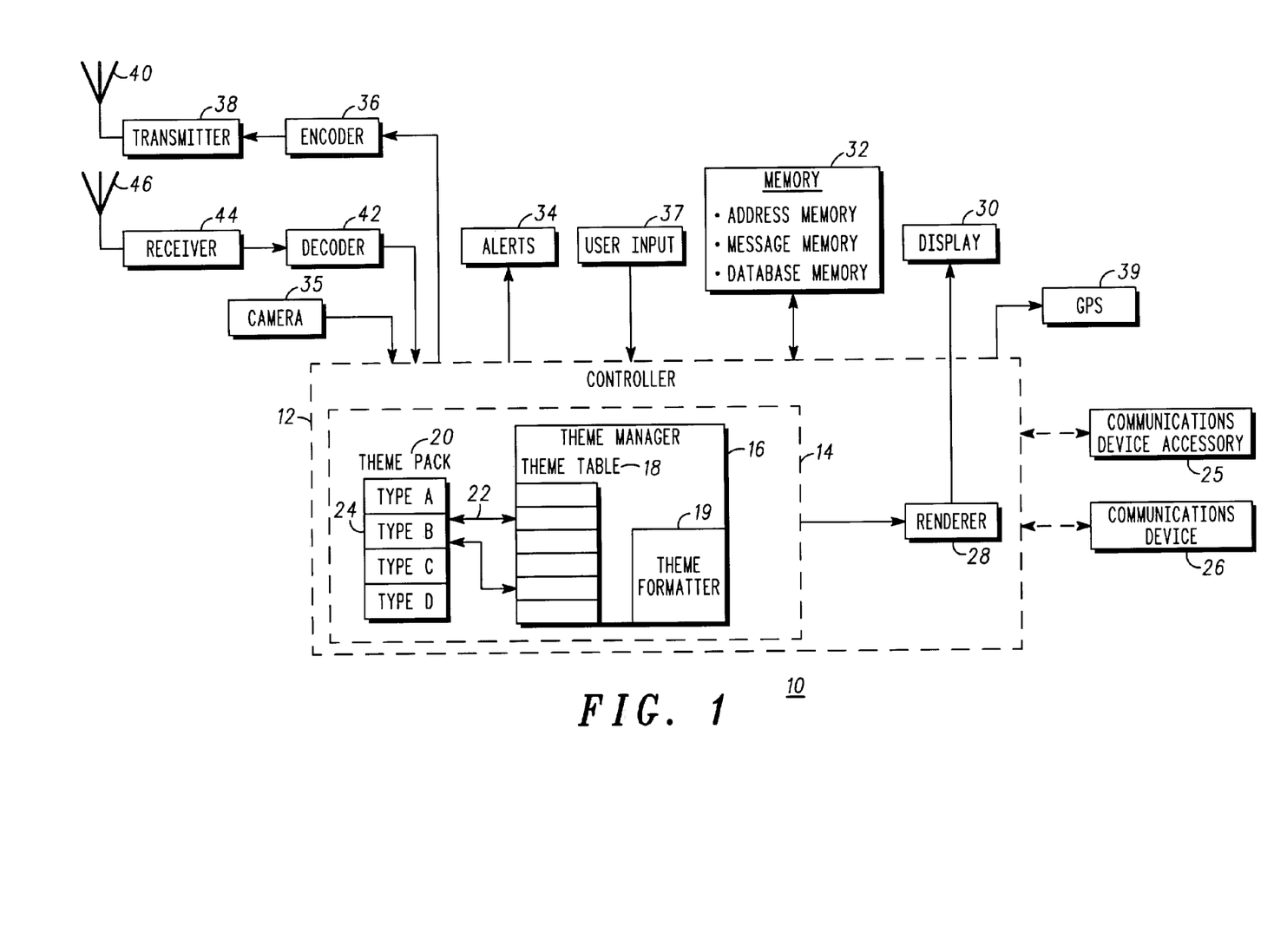
FIG. 1 illustrates a block diagram of a communication device having dynamically configurable skins and themes in accordance with the present invention.

Referring to FIG. 1, a block diagram of a portable communication device 10 can comprise a conventional cellular phone, a two-way trunked radio, a combination cellular phone and personal digital assistant, a smart phone, a home cordless phone, a satellite phone or even a wired phone having an appartus for modifying skins and themes in accordance with the present invention. In this particular embodiment, the portable communication device 10 can include an encoder 36, transmitter 38 and antenna 40 for encoding and transmitting information as well as an antenna 46, receiver 44 and decoder 42 for receiving and decoding information sent to the portable communication device 10. The device 10 can further include an alert 34, memory 32, a user input device 37 (such as a keyboard, mouse, voice recognition program, etc.), a location device (such as GPS 39), a camera 35, and a display 30 for at least displaying a variety of skins and themes as will be further detailed below. The device 10 can further include a processor or controller 12 coupled to at least the display 30, the encoder 36, the decoder 42, the alert 34, the user input 37 and the memory 32. The controller 12 can also be coupled to the camera 35 and GPS 39. The memory 32 can include address memory, message memory, and memory for database information or for the themes and skins data information. The themes and skins information can reside in external memory (32) or in internal memory 14 within the processor 12 as shown. The memory (either internal or external) can have stored therein at least two skin and theme types and at least one encapsulated data entry associated with each skin and theme type. The processor 12 can be programmed to dynamically update the display 30 in the communication device 10 based upon a selection of at least one among the at least two skin and theme types and based upon the at least one encapsulated data entry associated with a selected skin and them type. In another aspect of the invention, the processor 12 can be programmed to dynamically customize a skin and theme displayed on the communication device 10 and to dynamically customize data associated with at least one program for rendering the display based on an event. The event could be coupling the communication device to an accessory 25 or to another communication device 26.

Multiple skin and theme types 24 can form a part of a theme pack 20. A theme pack can comprise a binary file including at least one among a video file, an audio file, or an image file which has the information for various screen types in a portable communication product. For example, a screen type "A" can have a Harry Potter theme, and a screen type "B" can have the Disney theme. Theme packs can be downloaded over the air and the screen can be updated live. A theme manager 16 can update a theme table 18 using information from at least one selected skin and theme type (24) from a single theme pack 20. The theme manager can extract theme information associated with selected theme type or types. The theme table 18 can have the information necessary for rendering a screen or display using a renderer 28 in accordance with the selected theme type or types and can be updated using pointers 22 or other means known to those skilled in the art. The device 10 can also include a theme formatter 19 for formatting and updating the display 30 with theme image data derived from the theme table or theme property table 18. The theme manager is a software component, which can be embedded in subscriber software. This component knows to decipher the theme packs and separate all the screen related information. The screen related information can be stored in the theme property table or theme table. Whenever a new screen is drawn to the display, the theme manager looks in the theme table and draws the various screens with the associated theme. For example, when the application draws the screen type "A", then the user will see the Harry Potter theme and when the application draws the screen type "B" then the user will see the Disney theme.

The selection of at least one among the skin and theme types 24 can occur upon an event recognizable by the portable communication device 10. Although not by any means an exhaustive list, such events can include receipt of a message or call from a recognized caller, detection of a particular user input or user mode such as a call to a particular person, detection of a change in location using GPS or other means (triangulation, base station identifiers, etc.), detection of a particular image by the camera, and a detection of device attachment to the portable communication device.

Figure 2:
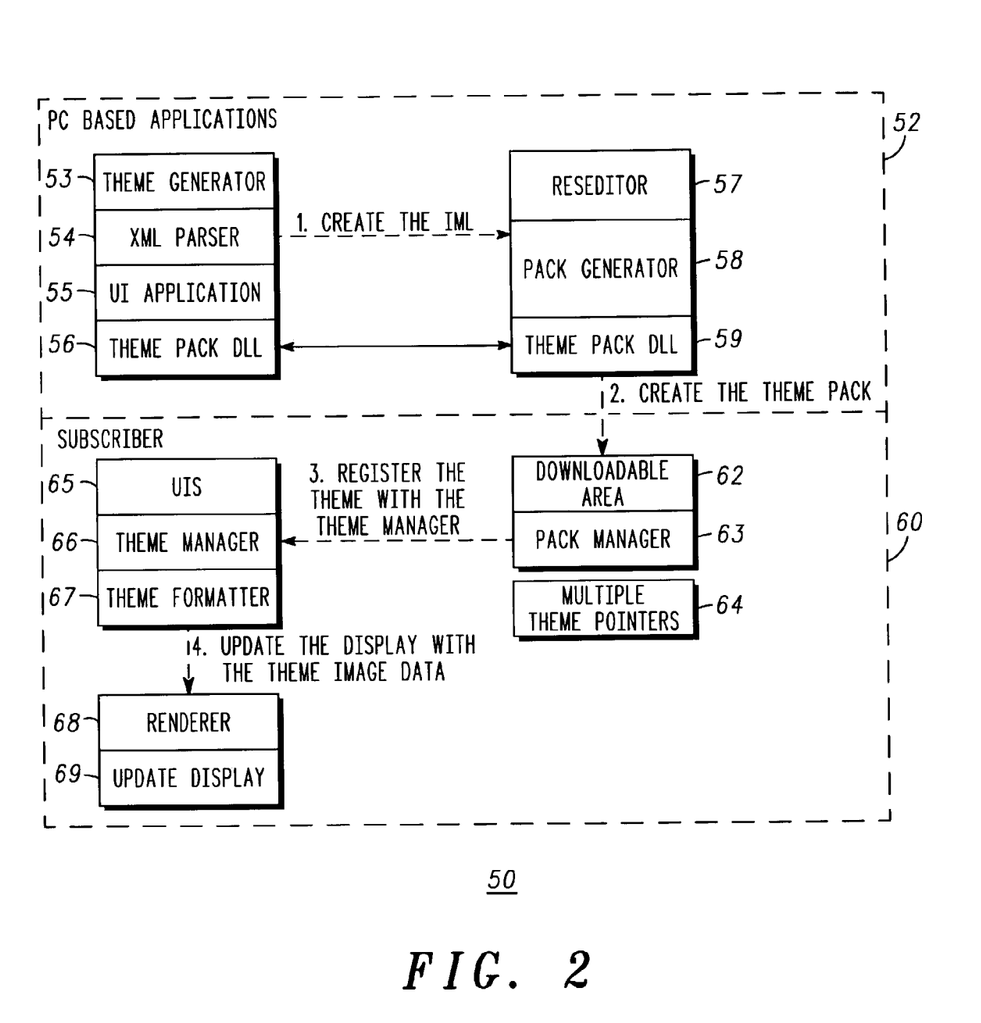
FIG. 2 is a block diagram illustrating personal computer based and subscriber based applications for changing skins and themes in a subscriber in accordance with the present invention.

Referring to FIG. 2, a system 50 having computer based portion 52 and subscriber based portion 60 of applications for changing skins and themes in a subscriber in accordance with the present invention is shown. The computer based portion 52 and the subscriber based portion can also be thought of as non-runtime elements and runtime elements respectively of the system 50. The computer based portion 52 can include a series of personal computer based applications such as a theme generator 53, an XML parser 54, a user interface application 55 and a theme pack dynamic linked list (DLL) portion 56. The system 50 can also include a resource editor or reseditor 57, a pack generator 58 and another theme pack DLL portion 59. The subscriber based portion 60 includes a downloadable area 62, a pack manager 63, and theme pointers 64 as well as a user interface service 65, a theme manager 66, a theme formatter 67, a renderer 68 and a display 69.

Operationally, the theme generator 53 can create instructions used to specify a layout of screen elements using an XML based scripting language such as iDEN Markup Language or iIML. The theme generator can be a PC based application that interprets the iML script and can be used by a user to view and edit the iML script. Once a new or edited version of iML script is provided by the theme generator 53 to the reseditor 57, the reseditor 57 can then generate the appropriate files (such as .c and .h files) with appropriate formatter and image data. The reseditor 57 in conjunction with the pack generator 58 and DLL portions 56 and 57 essentially create a theme pack that is typically down-loaded using a pack manager 63 to a downloadable area 62 in the subscriber unit during power up of the portable communication device or subscriber. The downloadable area 62 can be part of a digital rights management (DRM) unit for appropriately controlling the use of licensed data. The processor in the portable communication device can be programmed to register the theme pack with the theme manager 66 and to create a theme formatter 67 if a dialog type has a theme associate with it. In the portable communication device, phone dialogs of primary importance can include an iconic main menu, an idle screen, a status manager, an iconic picker application dialog, and a splash screen for example. Note that embodiments in accordance with the present invention can be use to enhance all User Interfaces in the portable communication device.

Figure 3:
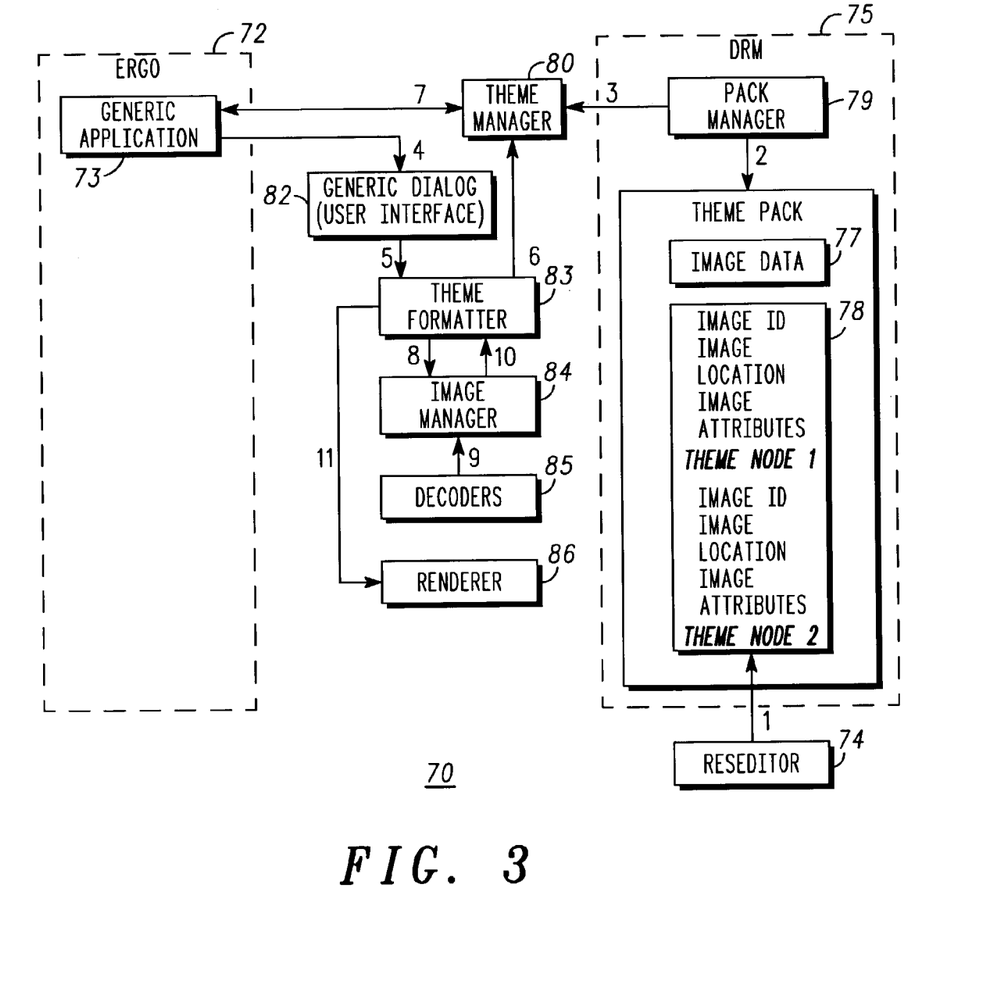
FIG. 3 is a flow diagram illustrating the interaction between an application, a user interface and a digital rights management unit for changing skins and themes in accordance with the present invention.

In a more detailed view of the operation of managing skins and themes in accordance with the present invention, a flow diagram illustrates the interaction between an application 72, a user interface and a digital rights management unit 75 in a system 70 as shown in FIG. 3. Initially, a reseditor 74 generates a theme pack 76. The theme pack 76 can include any type of multimedia file such as image data files 77, MIDI files, and Font Data. Also, the theme pack 76 can have a plurality of theme nodes 78. A typical theme node can have a theme identification number, an image location and image attributions. For example, an image location can be the location of the bitmap and an attribute can be the justification of the bitmap. A pack manager 79 can load the theme pack 76 during the power up of the phone or portable communication device, although the present invention is not limited to loading the theme pack during power up. For example, the pack manager 79 can be embodied to enable the downloading of theme packs at the request of a user or a carrier including enabling the downloads of theme packs over the air. The pack manager 79 then registers the theme pack 76 with a theme manager 80. The pack manager 79 (under a DRM scheme for example) can keep an account of the number of themes loaded into a phone. An application such an iconic main menu application 73 can create generic dialog or user interface such as an iconic main menu 82. The iconic main menu 82 creates the theme formatter 83 if a dialog type has a theme associated with it. The (Iconic Main menu) theme formatter 83 checks with the theme manager 80 to find out if a theme exists for the Iconic Main Menu 82. If a theme exists, then the theme manager adds an indicator enabling the use of such theme for given associated events. The application 72, in response to this indicator, can query various capabilities of the theme. The theme formatter 83 can then start updating a display from the top most display coordinates to the bottom most display coordinates. An image manager 84 then invokes the appropriate decoder 85 for the image decoding, whereupon the decoder 85 decodes the image. The image manager 84 then passes the data to the theme formatter 83. The Iconic Main Menu 82 can then draw the content to a Renderer 86 via a Window Manager in response to the Renderer 86. Once again, it should be understood that the iconic main menu 82 is merely shown as an exemplary embodiment and that the present invention can be applied to other generic dialogs or user interfaces.

Figure 4:
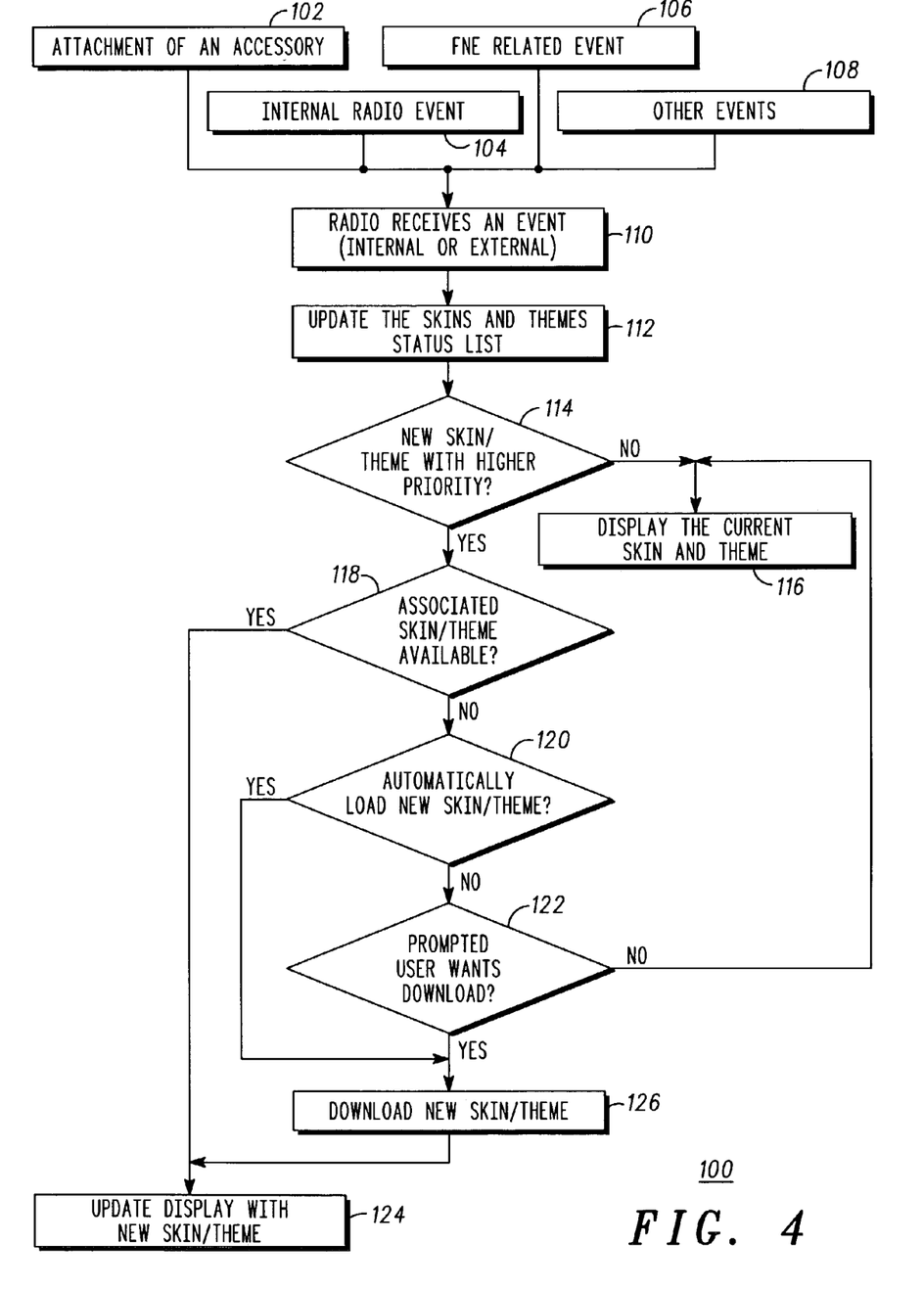
FIG. 4 is a flow chart illustrating a method of customizing mobile phone device functionality based on an event in accordance with the present invention.

Referring to FIG. 4, flow chart illustrating a method 100 in accordance with an embodiment of the present invention of customizing a skin and theme on a display of a portable communication device upon an event is shown. The events that can trigger customization can include an attachment of an accessory 102, an internal radio event 104, an FNE related event 106 or any other number of events 108. Such events can include more specifically detecting an attachment of an accessory to a portable communication device, detecting an idle display, detecting a change in location, detecting a user request, detecting a receipt of a message from a predetermined party, detecting a call from a predetermined party, detecting a broadcast, and detecting a given time of day. The events that can trigger the customization are merely illustrative and should not be limited by the examples provided. The method 100 can essentially comprise the steps of determining if an event has occurred where the event has an associated skin and theme and if the associated skin and theme exists, updating a display with the associated skin and theme.

In a more specific embodiment a radio can receive an event (102, 104, 106, or 108) at step 110 where a skins and themes status list is updated at step 112. At decision block 114, the method can determine if the updated skin and theme is of a higher priority than a current skin and theme. If not, then the current skin and theme is displayed at step 116. If the updated or new skin and theme is of a higher priority, then it is determined is an associated skin and theme is available at decision block 118. If available, the display is updated with the new skin and theme at step 124. Alternatively, if the associated skin and theme is unavailable at decision block 118, then it can be determined at decision block 120 whether the new skin and theme should be automatically downloaded based on user settings. If the automatic downloading is desired at decision block 120, then the new skin and theme is downloaded at step 126 and the display is updated at step 124. If the automatic downloading is not desired at decision block 120, then the user can alternatively be prompted on whether they want a download at decision block 122. If the user does not want to download the new skin and theme, then the current skin and theme will be displayed at step 116. If the user does want to download the new skin and theme at decision block 122, then the new skin and them is downloaded at step 126 and the display is updated at step 124.

A few concrete illustrative examples of events that can trigger customization can include the attachment of a car kit to a mobile phone which could cause a particular skin and theme having a race car wallpaper or background with larger fonts and midi tones to allow for better user functionality while in a vehicle. In another example, a radio in a idle mode can have a radio palette on a display that is slightly visible and uses less energy to display. Another screen during power up of the radio or during a particular time of day can display a weather forecast with a given skin and theme. In yet another example, a theme park or various vendors at a mall can trigger different skins and themes based on location information (such as GPS data) available to a mobile radio. In another example, a public service phone can have a backsplash based on a broadcast which can indicate a particular security level status (for example, Red, Orange, Yellow, Blue, Green).

Figure 5:
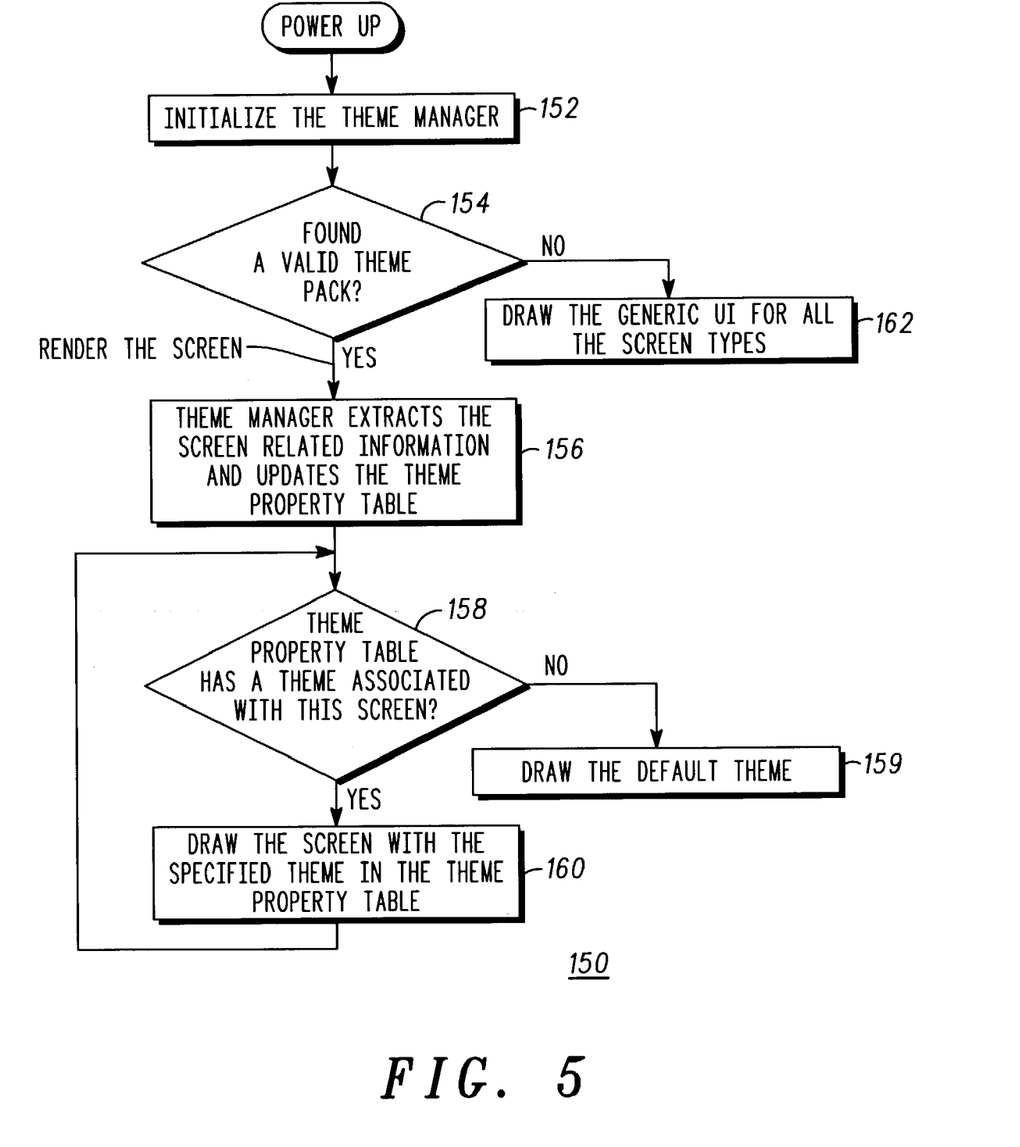
FIG. 5 is a flow chart illustrating the operation of a theme manager in accordance with the present invention.

In another aspect of the present invention, a user can personalize various screens on a portable communication product using a single theme pack. Referring to FIG. 5, a flow chart illustrating a method 150 of customizing a user interface or screen using a theme manager in accordance with the present invention is shown. At step 152, the theme manager is initialized after power up. The theme manager scans through the theme pack during initialization. If a no valid theme pack is found at decision block 154, then a generic user interface is drawn for all screen types at step 162. If a valid theme pack is found at decision block 154, then the theme manager extracts the screen related information such as theme information, font information and color scheme information for various screens types and updates the theme table at step 156. Whenever the new screen type is drawn to the display the theme manager checks in the theme table to see if this screen type has an associated theme associated with it as shown at decision block 158. If theme table lacks a theme associated with the new screen, then the method draws a default theme at step 159. If the theme table has a theme associated with the screen, then the screen is drawn with the new theme at step 160. The theme manager does this for every screen type that is drawn to the display, hence the loop back from step 160 for every render event. This results in drawing different screen types with their own associated theme(s) by means of a single theme pack. As previously explained above, the theme manager can also respond to events and activate a theme already present in the phone or ask the user to download a particular type of theme. Thus, the method 150 packs data for multiple screen types and deciphers the theme pack for multiple phone screen types. The method further enables the activation of a theme in response to events and updates a screen dynamically.

Figure 6:
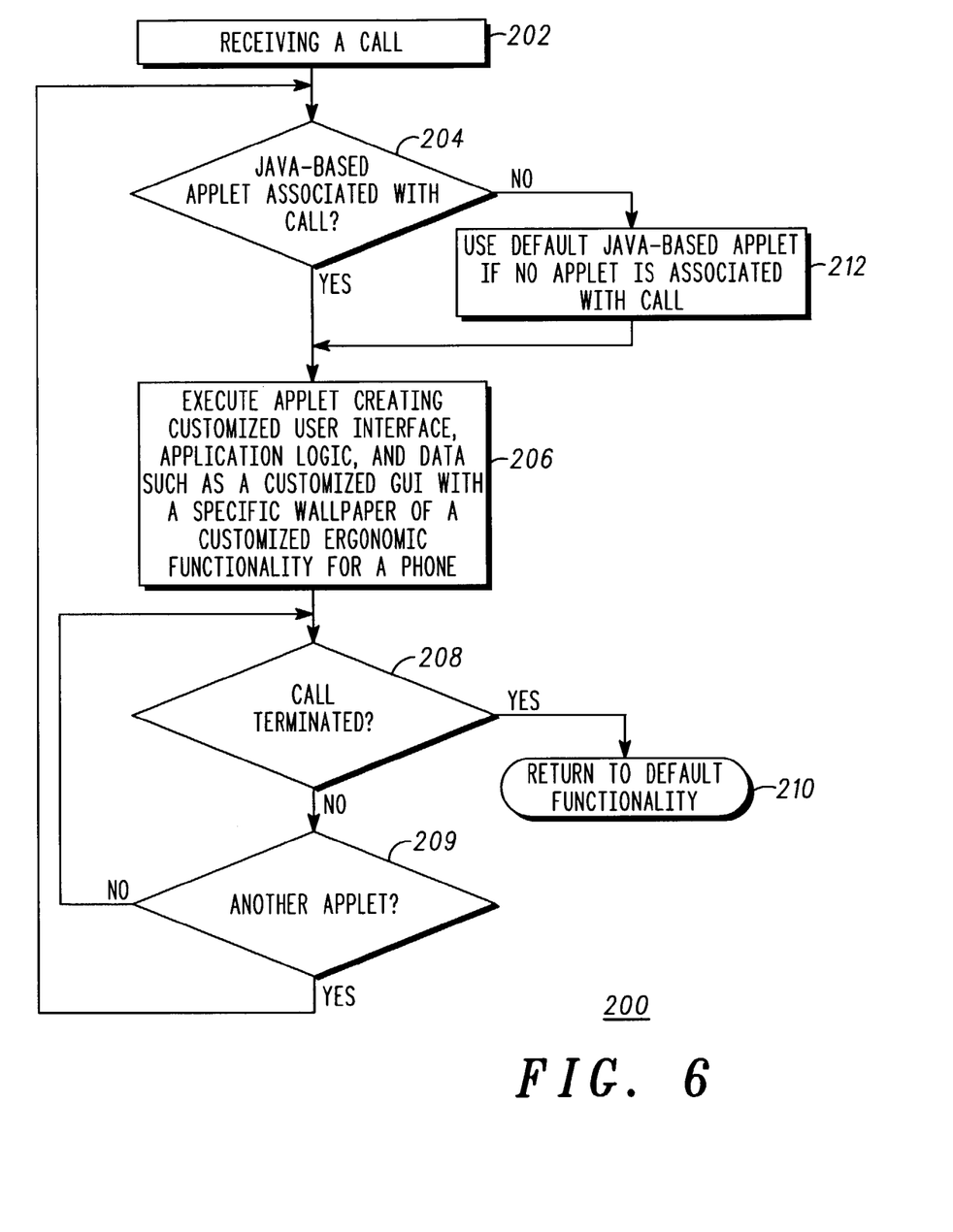
FIG. 6 illustrates a flow chart of a method of customizing mobile phone device functionality in accordance with the present invention

One of the events that can trigger a customized user interface or skin and theme on a display can include receiving a call at a portable communication device. Referring to FIG. 6, a flowchart illustrating a method 200 of customizing mobile phone device functionality based upon peer-to-peer coupling using a Java-based application is shown. The method 200 begins at step 202 by receiving a call accessing a java-based applet associated with the call among a plurality of java-based applets forming the Java-application. "Receiving a call" can involve extracting data from caller identification information when receiving a phone call or extracting data from user input when a user is attempting to initiate a phone call. At decision block 204, it is determined if a java-based applet is present associated with the received call. If no java-based applet is available associated with the received call among the plurality of java-based applets forming the Java-based application, then at step 212 a default java-based applet is accessed and executed.

If a java-based applet is available at decision block 204, then such java-based applet is used to create a customized user interface, application logic, and data while the call associated with the java-based applet is active at step 206. The java-based applet can create a customized ergonomic functionality for the mobile phone device such as a customized graphical user interface having a specified wallpaper associated with the java-based applet or a particular ring tone or background music. Each applet can provide a unique environment specified by the user. The method continues by monitoring if the call is terminated at decision block 208. If the call is not terminated at decision block 208, then it is determined if another applet is called or accessed at decision block 209. If no other applet is called or accessed at decision block 209, then the method 200 returns to decision block 208. If another applet or is accessed or called at decision block 209, then the method 200 returns to decision block 204 as shown. If the call is terminated at decision block 206, then the mobile phone device can be returned to a default normal operation at step 210.

Thus, by use of applets, a user can customize the functionality of their communication device and possibly the functionality of the communication device being communicated with based upon who the communicating parties are, how the parties are communicating, and where the communicating parties are communicating from. Generally, a user can program a particular applet to make the communication device function in a manner indicative of the partying calling. For example, if a girlfriend calls, the user can program a particular applet associated with the girlfriend to display hearts and flowers on the communication device and play a love song in the background if desired. Alternatively, if a boss is calling, a pointy-haired character from the Dilbert cartoon series can be displayed with programmed static added in the background.

In another aspect of the invention, if a calling party has a GPS device and they are in Florida, then a receiving party in Chicago might be able to see an Miami Dolphins insignia on their wallpaper backsplash while speaking to the calling party. If the receiving party in Chicago also has a GPS device, then the calling party in Florida might be able to see a picture of a Chicago Bear insignia on their backsplash. As the party in Chicago travels through the campus of a particular university in the Chicago area, the calling party might be able to see another picture, possibly of a corresponding college mascot on the backsplash.

In light of the foregoing description of the invention, it should be recognized that the present invention can be realized in hardware, software, or a combination of hardware and software. A method and system for modifying a skin and theme screen in a communication device according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. A computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A portable communication device having a customizable skin and theme on a display of the communication device, comprising:
    a transceiver;
    a display coupled to the transceiver;
    a memory having stored therein at least two skin and theme types and at least one encapsulated data entry associated with each of the at least two skin and theme types;
    a processor coupled to the transceiver and the display, wherein the processor is programmed to dynamically update the display in the communication device responsive to an environmental event external to the portable communication device that triggers a selection at least one among the at least two skin and theme types and based upon the at least one encapsulated data entry associated with a selected skin and theme type; and
    a theme manager that updates a theme table using information from a selected one among the at least two skin and theme types from a single theme pack downloaded into the memory based on a location of a calling party calling the portable communication device.

2. The portable communication device of claim 1, wherein the portable communication device further comprises a theme manager that updates a theme table using information from a selected one among the at least two skin and theme types from a single theme pack downloaded into the memory based on a location of a predetermined party serving as the calling party calling the portable communication device.

3. The portable communication device of claim 2, wherein the portable communication device further comprises a graphical user interface.

4. The portable communication device of claim 2, wherein the theme pack includes a plurality of theme types associated with the environmental event which is at least one of a receipt of a message, a recognized incoming call, detection of a particular image by the camera, and detection of a device attachment to the portable communication device.

5. The portable communication device of claim 2, wherein the theme pack comprises a binary file including a video file, an audio file, and an image file.

6. The portable communication device of claim 1, wherein the selection of at least one among the at least two skin and theme types occurs upon an event recognizable by the portable communication device.

7. The portable communication device of claim 1, wherein the portable communication device is selected from the group of devices comprising a cellular phone, a two-way trunked radio, a combination cellular phone and personal digital assistant, a smart phone, a home cordless phone, and a satellite phone.

8. The portable communication device of claim 1, wherein the portable communication device further comprises
- a theme property table in the memory having information necessary for rendering a screen in accordance with a selected theme type; and
- a theme manager for extracting theme information associated with the selected theme type and the environmental event among the multiple theme types and updating the theme property table with the theme information.

9. The portable communication device of claim 8, wherein the portable communication device further comprises a theme formatter for formatting and updating the display with theme image data derived from the theme property table.

10. The portable communication device of claim 8, wherein the portable communication device further comprises a personal computer based theme generator application having a theme pack dynamic linked list for generating a theme pack and uploading the theme pack to the memory in the portable communication device.

11. The portable communication device of claim 1, wherein the portable communication device further comprises a theme manager that updates a skin and theme based on an image captured by a camera of the portable communication device.

12. The portable communication device of claim 1, wherein the portable communication device further comprises a theme manager that updates a skin and theme based on an attachment device connected to the portable communication device and further upon a detection of a location of a call from a predetermined calling party.

* * * * *